(12) United States Patent
Van Der Meulen et al.

(10) Patent No.: US 8,571,367 B2
(45) Date of Patent: Oct. 29, 2013

(54) FIBER OPTIC FURCATION ASSEMBLY

(75) Inventors: Theo Van Der Meulen, Boxtel (NL); Paul Schneider, Gemonde (NL); Frans Van Geijn, Baarle (NL)

(73) Assignee: Tyco Electronics Nederland BV, Ar's Hertogenbosh (NL)

( * ) Notice: Subject to any disclaimer, the term of this patent is extended or adjusted under 35 U.S.C. 154(b) by 273 days.

(21) Appl. No.: 12/737,124

(22) PCT Filed: May 18, 2009

(86) PCT No.: PCT/EP2009/056014
§ 371 (c)(1),
(2), (4) Date: Dec. 10, 2010

(87) PCT Pub. No.: WO2009/150011
PCT Pub. Date: Dec. 17, 2009

(65) Prior Publication Data
US 2011/0091169 A1    Apr. 21, 2011

(30) Foreign Application Priority Data

Jun. 10, 2008 (NL) .................................... 08010508

(51) Int. Cl.
*G02B 6/44* (2006.01)
(52) U.S. Cl.
USPC ........... 385/100; 385/101; 385/102; 385/103; 385/104
(58) Field of Classification Search
USPC .......................... 385/100, 101, 102, 103, 104
See application file for complete search history.

(56) References Cited

U.S. PATENT DOCUMENTS

| 4,884,862 A | 12/1989 | Kofod |
| 6,389,214 B1 | 5/2002 | Smith et al. |
| 7,270,485 B1 | 9/2007 | Robinson et al. |
| 7,703,990 B1 * | 4/2010 | de Jong et al. .................. 385/87 |

FOREIGN PATENT DOCUMENTS

EP    0 355 639 A    2/1990

OTHER PUBLICATIONS

International Preliminary Report on Patentability, dated Dec. 13, 2010, issued by the International Bureau of WIPO, Geneva, Switzerland, for PCT/EP2009/056014; 7 pages.
International Search Report for PCT/EP2009/056014 issued by the European Patent Office on Aug. 5, 2009.

* cited by examiner

*Primary Examiner* — Jennifer Doan
(74) *Attorney, Agent, or Firm* — Faegre Baker Daniels LLP (57) ABSTRACT

The invention relates to a fiber optic furcation assembly (1) which comprises an over-molded body (2) formed from a flexible material, having a first end (15) and an opposed second end (16), the first end (15) being adapted to receive a portion of a fiber optic distribution cable (3) having at least two optical fibers (7), and the second end (16) being adapted to receive a portion of at least one furcation cable jacket (13) sheathing at least one furcated optical fiber (7') from the fiber optic distribution cable (3), at least one of the fiber optic distribution cable (3) and the furcation cable jacket (13) comprising reinforcement members (9, 12). To reduce the load of the optical fibers (7) within the furcation assembly at least a portion of the reinforcement members (9, 12) is anchored within the over-molded body (2) so as to transmit a load from the over-molded body via the anchored reinforcement members (9, 12) to the respective cable (3, 4).

16 Claims, 9 Drawing Sheets

FIBER OPTIC FURCATION ASSEMBLY

The invention relates to a fiber optic furcation assembly, comprising an over-molded body formed from a flexible material, having a first end and an opposed second end, the first end being adapted to receive a portion of a fiber optic cable having at least two optical fibers, and the second end being adapted to receive a portion of at least one furcation cable jacket sheeting at least one furcated optic fiber from the fiber optic cable, at least one of the fiber optic distribution cable and the furcation cable jacket comprising reinforcement members.

Fiber optic cable is available in many physical variations. There are, for instance, single and multiple fiber constructions, aerial and direct burial cable types. Usually an outer jacket of PVC or similar material is extruded over the cable to protect the inside of the cable from environmental impacts. The fibers are protected by a loose fitting tube or a tight fitting buffer coating. In the loose tube method the fiber is enclosed in a plastic buffer-tube that is larger in inner diameter than the outer diameter of the fiber itself. Since the fiber is basically free to float within the tube, mechanical forces acting on the outside of the cable do not reach the fiber. In the tight buffer construction, a thick coating of plastic is applied directly to the outside of the fiber itself. This results in a smaller overall diameter of the entire cable and an improved resistance to crushing or overall impact-type forces.

Often the fiber or the buffer tube is enclosed in a layer of synthetic yarn such as aramid for reinforcement. In multi-fiber cables, an additional reinforcement string is sometimes added. These reinforcement members support the cable against traction forces exerted onto the cable.

US 2007/0009214 A1, U.S. Pat. Nos. 7,127,143 B2, 7,277,614 B2, US 2006/0056782 A1 and U.S. Pat. No. 7,155,093 B2 disclose fiber optic cable assemblies comprising a fiber optic distribution cable having predetermined optical fibers terminated and branched at a cable access point and a tether cable optically connected to the predetermined optical fibers. The cable access point is encapsulated by a flexible over-molded body. To protect the components of said cable access point, an over-molding material blocking wrap or protective layer is added around the distribution or tether cable prior to over-molding.

To provide the cable assembly with a preferential bend along an access that is common to the distribution cable and the tether cable, the assemblies described in US 2006/0056782 A1 and U.S. Pat. No. 7,155,093 B2 comprise a strength member positioned within the over-molded body. Additionally, the over-molded bodies are geometrically configured in a way that promotes bending along a common axis.

For protecting the untreated portion of the optical fibers and to provide a guide channel for the optical fibers to the tether, the assemblies described in the US 2007/0009214 A1, US 2006/0056782 A1 and U.S. Pat. No. 7,155,093 B2 have flexible tubings, routing the optical fibers of the tether, optically connected to the optical fibers of the distribution cable, out of the over-molded body.

U.S. Pat. No. 6,771,851 B2 shows a flexible optical fiber furcation assembly which comprises a flexible furcation body for receiving a fiber optic cable and for routing a furcated leg. The furcation assembly includes a first fiber optic holding component securable about the fiber optic cable, and a second fiber optic holding component securable around the portion of at least one leg of the fiber optic cable to support and secure the optical fibers during use and assembly. To hold the optical fibers in place and to seal the ends of the furcation body, the assembly comprises a first furcation end component securable about the first end of the furcation body and a second furcation end component securable about the second end of the furcation body, both preferably made of blue lined heat shrink material. The furcation body is filled with a holding and adhesive material, filling the voids within the assembly to secure and support the fiber optic cable and the optical fibers.

U.S. Pat. No. 7,242,841 B2 discloses a flexible cross-connect apparatus for cross-connecting fiber optic cables. To provide for a preferential bending plane, the cross-connect apparatus includes a transition string member formed from a flexible material that is shaped so that it has a preferential bend characteristic. The fiber optic cable jackets are connected to the opposing ends of the transition string member by cable clamp assemblies.

To reduce furcation assemblies in price, U.S. Pat. No. 7,266,274 B2 and US 2008/0019641 A1 disclose a pre-connectorized fiber optic distribution cable assembly which includes a mid-span access location along the length of a distribution cable. The mid-span access location, the accessed, terminated and connectorized optical fiber, the optical fiber and at least a portion of the receptacle are encapsulated by a protective over-molded shell.

U.S. Pat. No. 4,840,451 discloses a fiber optic connector assembly comprising an elastomeric strain relief member which is over-molded onto the cable at a predetermined position. The strain relief member provides protection against rearward cable pull-out and flexible relief.

The optical fibers within fiber optic cables are protected from the external environment by a cable jacket. The cable jacket may comprise reinforcement members and protective elements surrounding the optical fibers. Additionally, the cable jacket can comprise a central reinforcement member, arranged centrally within the cable between the optical fibers. Each of these cable components may have different thermal coefficients of expansion. As fiber optic cables are exposed to extreme temperatures, the differing thermal expansion coefficients become significant. Fiber optic cables may be exposed to operating temperatures between −10 and +60° C. At these temperatures, the differing degrees of elongation or contraction among the elements of the cable or the furcation assembly result in strains within the fibers and may damage the fibers or cause unacceptable attenuations of signals being transmitted over the optical fibers.

Additionally, the furcation assembly may be strained by forces exerted on the cables or the furcation assembly. Such strains, particularly bending strains, may result in damage to the fibers, causing micro-bendings of the fibers and transmission losses.

Hence, there remains a need for a furcation assembly that overcomes these drawbacks of conventional furcation assemblies.

This problem is solved according to the invention by anchoring at least a portion of the reinforcement members within the over-molded body so as to transmit a load from the over-molded body via the anchored reinforcement members to the respective cable. Thus, external loads impacting the over-molded body or the fiber optic cables do not affect the optical fibers.

To reduce loads exerted on the optical fibers within the furcation assembly, the furcation assembly can be provided with a guiding element for guiding the furcated or branched optical fibers and can be arranged between the first and the second end of the over-molded body.

In a further embodiment of the invention the guiding element may be provided with at least two openings. By arranging the furcated optical fibers moveable within the openings of the guiding element the optical fibers may float. Thus, strains impacting the optical fibers due to the external loads on the over-molded body or the fiber optic cables are reduced by evasive movements of the optical fibers.

The guiding element may serve as a spacer to ensure a predefined distance between the furcated fibers. It can be formed as a perforated disc or a grid, providing two or more openings, each for receiving one or more fibers.

In order to improve the movability of the optical fibers within the furcation assembly the optical fibers can be arranged separate from each other. Each single optical fiber may be allocated to an opening of the guiding element, arranging only a single optical fiber within an opening. Such a detached guiding of the optical fibers avoids friction between the fibers and thereby facilitates the sliding movement.

The openings of the guiding element may extend in a longitudinal direction, pointing from the first end to the second end of the over-molded body. This axial aligning of the openings to the fiber direction of the distribution cable and/or the furcation cables allows for a low profile, minimum diameter furcation assembly. Alternatively, the openings may be arranged funnel-shaped or diverging to correspond to different outer diameters of the incoming distribution cable and the outgoing furcation cable. For example, if each single furcated fiber is provided with a furcation cable jacket, the radial distance between the fibers increases from the first end of the over-molded body to the second end of the over-molded body. Thus, openings which diverge from the first end onto the second end of the over-molded body can reduce the length of the fibers within the over-molded body and decrease the friction between the fibers and the guiding element.

In a further embodiment of the invention, the guiding element can be made of substantially rigid material. The rigid guiding element protects the optical fibers and the furcation assembly against transversal forces exerted onto the furcation assembly. Stiff openings within the guiding element inhibit a contraction of the openings while the guiding element is compressed by external forces.

To reduce the guiding element in price, it may be made from an integral, molded body. The guiding element can preferably be manufactured by injection molding.

To broaden or to extend the furcation assembly the furcation assembly may comprise at least two guiding elements having at least one undercut protrusion and/or at least one undercut groove. By adapting the shape of the groove of at least one first guiding element to receive the protrusion of at least one second guiding element, the protrusion of the second guiding element can be inserted into the groove of the first guiding element to build up a form closure. In this manner several guiding elements can be connected to each other to configure any number of openings for receiving optical fibers. One or several protrusions and/or grooves can be arranged on any side surface of the guiding element to allow for the combination of any desired numbers of guiding element with arbitrary geometries.

To protect the optical fibers and to prevent the molding material from filling the voids between the fibers, the furcation assembly may comprise a protection tube. To maintain the movability of the optical fibers within the over-molded body, according to the flexibility of the furcation assembly the protection tube encases at least a section of the fibers between the first and the second end of the over-molded body. The protection tube is preferably made of plastic and may be made of resilient material to increase the flexibility of the furcation assembly. To improve the mechanical protection of the optical fibers, the protection tube can alternatively be formed as a crush-resistant, rigid tube.

In another exemplary embodiment, the protection tube has an end facing the second end of the over-molded body, which is closed by the guiding element. By using the guiding element as closure for the protection tube, the filling of the tube with molding material is avoided without additional parts. To seal the closure, the end of the protection tube closed by the guiding element can be provided with a shape which is adapted to the shape of the portion of the guiding element closing the protection tube. For example, the guiding element may be inserted into the end of the protection tube, the outer shape of the guiding element abutting the inner shape of the protection tube.

The end of the protection tube facing the first end of the over-molded body may be closed by the outer jacket or the buffer tube of the fiber optic distribution cable. The outer surface of the portion of the fiber optic cable extending into the protection tube can abut the inner surface of the protection tube to build up a form closure. To seal the closure, the end of the protection tube closed by the fiber optic distribution cable can be adapted to the outer shape of the cable jacket.

In optical fibers, sharp but microscopic curvatures can create axial displacements of a few microns. These displacements, also referred to as micro-bending, lead to a transmission loss in optical fibers. To avoid such damages, the over-molded body comprises in another exemplary embodiment at least one strain relief portion which is adapted to deform resiliently in a direction substantially perpendicular to the longitudinal direction of the furcation assembly. The strain relief portion can be situated at the first and/or the second end of the over-molded body to absorb bending forces fed into the distribution cable or into the furcation cable. The strain relief portion has the ability to bend without incurring physical damage to the optical fibers disposed within and without significant attenuation in the optical fibers when exposed to stresses during installation or operation.

The strain relief portion may have recesses extending substantially perpendicular to the longitudinal direction of the over-molded body. By arranging the recesses perpendicular to the longitudinal direction of the furcation assembly, which corresponds substantially to the optical fiber direction, a geometrical configuration is built up that promotes the bending of the over-molded body along a preferred axis. By the geometry of the recesses, for example the broadness, the minimum bending radius of the strain relief portion can be predetermined. This allows for a minimal bending radius to avoid physical damages like micro-bending.

In a further exemplary embodiment of the invention, the reinforcement members can be incorporated directly into the over-molded body to build up a material fit or form closure between the cable and the over-molded body. If, for example, aramid fiber reinforced cable jackets are used for the distribution cable and/or the furcation cables, the aramid fibers can be separated from the cable jacket before molding the furcation assembly. By arranging the aramid fibers within the mold around the further components of the furcation assembly, the fibers are incorporated into the over-molded body.

In a further advantageous embodiment the fiber optic furcation assembly can comprise anchorage elements for anchoring the reinforcement members in the over-molded body. The anchoring elements can be connected to the reinforcement members in a load transmitting connection and can be embedded in the over-molded body. The reinforcement members, for example aramid fibers, can be connected to the anchoring elements by a form closure. The form closure can be built up by knots or a clamping connection.

In a further advantageous embodiment of the invention, the form closure connecting the reinforcement members to the anchoring elements can be built up by two cylindrical rings or circular eyelets with different diameters. By inserting the eyelet with the smaller diameter into the eyelet with the larger diameter and arranging the reinforcement members between the inner and the outer eyelet the reinforcement can be clamped by deforming the larger eyelet. Alternatively, the anchorage elements can be formed as grids, wires, or webs. The reinforcement fibers can be connected to the anchorage elements by gluing or by a screw clamp.

To allow for the combination of different geometries of the over-molded body and for connecting different cable geometries by the furcation assembly, the mold for molding the over-molded body can be built up by a modular assembly. By exchanging parts of the mold the furcation assembly can be adapted to different cable receive portions, strain relief portions or guiding elements within the over-molded body.

In order that the invention and its various other preferred features may be understood more easily, some embodiments thereof will now be described, by way of example only, with reference to the drawings in which.

Figure 1:
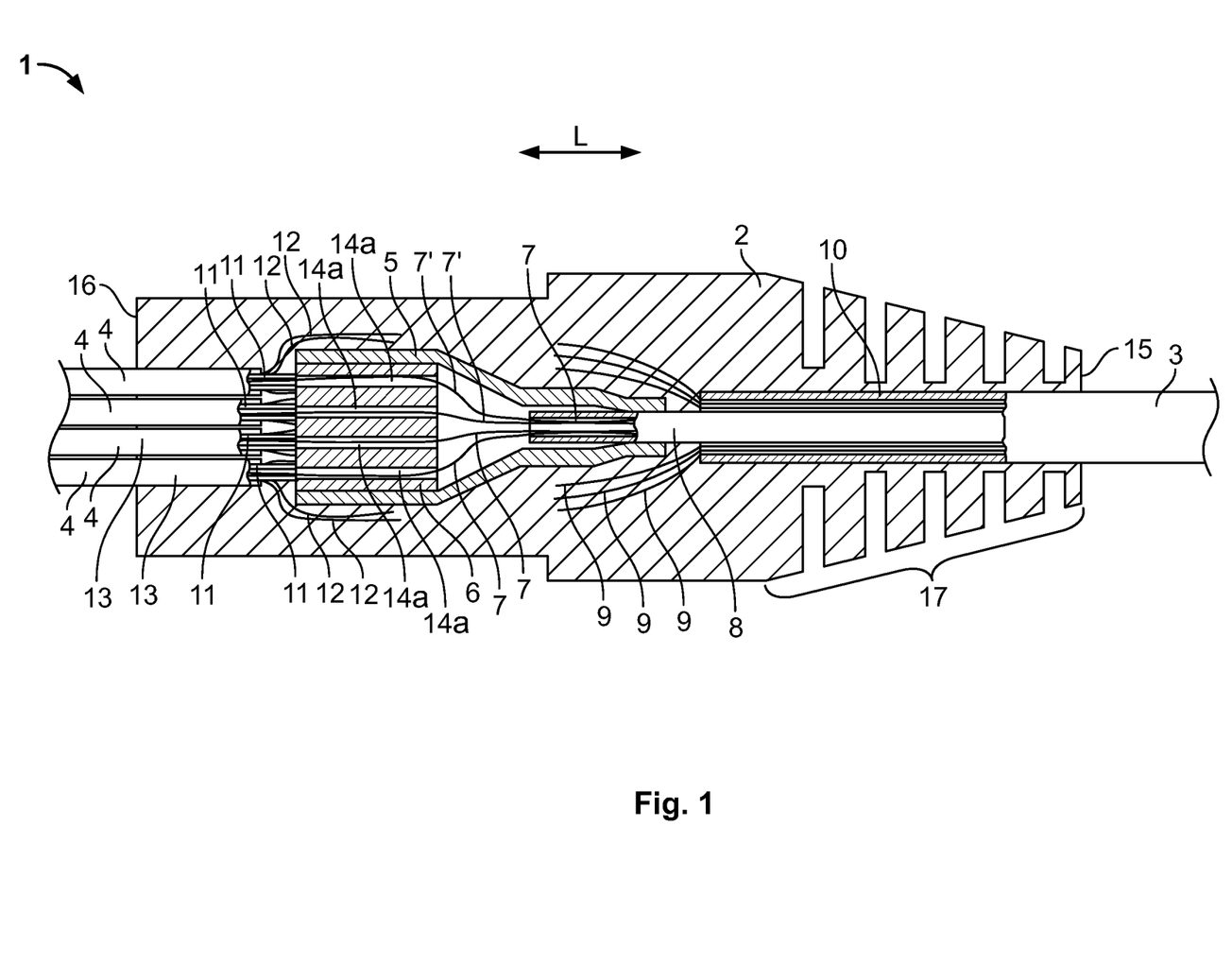
FIG. 1 is a cross sectional view of a first embodiment of the furcation assembly.

A preferred embodiment of the invention will now be described with reference to FIG. 1.

The furcation assembly 1 comprises an over-molded body 2, enclosing a fiber optic distribution cable 3 and furcation cables 4, formed as a plurality of loose tube single fiber optical cables 4. The furcation assembly 1 further comprises a protection tube 5 and a fiber guiding element 6.

The fiber optic cable 3 extends in longitudinal direction L into the over-molded body 2. The fiber optic cable 3 contains a plurality of optical fibers 7. The optical fibers 7 are surrounded by a buffer tube 8. Advantageously, the cable 3 has a set of reinforcement fibers 9 which are preferably made from aramid. An outer jacket 10 covers and protects the cable from environmental contaminations.

Also the single fiber optic cables 4 extend in longitudinal direction into the over-molded body 2, but opposing the fiber optic cable 3. As well as the fiber optic cable 3 the single fiber optic cables 4 comprise buffer tubes 11, reinforcement fibers 12 and protective outer jackets 13.

The protection tube 5 protects the furcated optical fibers 7' and prevents the molding material from filling the voids between the furcated optical fibers 7' to maintain the movability of the fibers. The protection tube 5 is preferably made of plastic, preferably of resilient material to increase the flexibility of the furcation assembly 1. To improve the mechanical protection of the optical fibers 7, the protection tube 5 can alternatively be formed as a crush-resistant, rigid tube.

The end of the protection tube 5 facing the second end 16 of the over-molded body 2 is closed by the guiding element 6. By using the guiding element 6 as closure for the protection tube 5, the filling of the protection tube 5 with molding material is avoided. To seal the closure, the end of the protection tube 5 receiving the guiding element 6 is provided with a shape which is adapted to the outer shape of the guiding 6. The outer shape of the guiding element 6 abuts the inner shape of the protection tube 5.

The end of the protection tube 5 facing the first end of the over-molded body 2 is closed by the buffer tube 8 of the fiber optic distribution cable 3. The outer surface of the portion of the fiber optic cable 3 extending into the protection tube 5 abuts the inner surface of the protection tube 5 and builds up a form closure.

The guiding element 6 serves as a spacer and ensures a predefined distance between the furcated fibers 7'. By the guiding element 6 the single furcated fibers 7' are guided from the portion of the fiber optic distribution cable which is received by the over-molded body 1 at the first end 15 to the furcation cable jackets 13. For guiding the single furcated optical fibers 7' the guiding element 6 comprises openings 14a extending in a longitudinal direction L, which points from the first end 15 of the over-molded body 2 to the second end 16 of the over-molded body 2. To improve the movability of the furcated optical fibers 7' within the furcation assembly 2 the furcated optical fibers 7' are arranged separate from each other. Each single furcated optical fiber 7' is allocated to an opening of the guiding element 6. This detached guiding of the furcated optical fibers 7' avoids friction between the fibers and thereby facilitates the floating of the fibers 7'. As the inner diameter of the cylindrical opening 14a is a little bit larger than the outer diameter of the single optical fibers 7, the furcated optical fibers 7' can slide freely in longitudinal direction L and float perpendicular to the longitudinal direction L within the guiding element 6.

The guiding element 6 has a substantially rectangular shape. Alternatively, the guiding element 6 can be formed as a perforated disc or grid, providing two or more openings, each for receiving one or more fibers.

The cable jackets 10, 13 of the fiber optic distribution cable 3 and of the furcation cables 4 comprise reinforcement members 9, 12 to support the cables 3, 4 against external forces exerted onto the fiber optic cables 3, 4. The buffer tubes 8, 11 are enclosed in a layer of aramid 9, 12. The reinforcement members 9, 12 are incorporated in the over-molded body 2 and build up a material fit or form closure between the fiber optic cables 3, 4 and the over-molded body 2. By this connection the reinforcement members 9, 12 reinforce the mechanical connection between the fiber optic cables 3, 4 and the over-molded body 2.

To incorporate the reinforcement members 9, 12 into the over-molded body 2 the reinforcement members 9, 12 are separated from the cable jacket 10, 13 before molding the over-molded body 2. By spreading the aramid fibers 9, 12 within the mold around the further components of the furcation assembly, during molding the aramid fibers 9, 12 are incorporated into the over-molded body.

To avoid damage or displacement of the optical fibers 7, also referred to as micro-bending, the over-molded body 2 comprises a strain relief portion 17, arranged at the first end 15 of the over-molded body 2. The strain relief portion 17 is adapted to deform resiliently in a direction substantially perpendicular to the longitudinal direction of the furcation assembly. Alternatively or additionally, the strain relief portion 17 can be situated at the second end of the over-molded body to absorb bending forces fed into the furcation cables. The strain relief portion 17 has the ability to bend without incurring physical damage to the optical fibers 7 disposed within and due to the increased bending radius without significant attenuation in the optical fibers 7.

Figure 2:
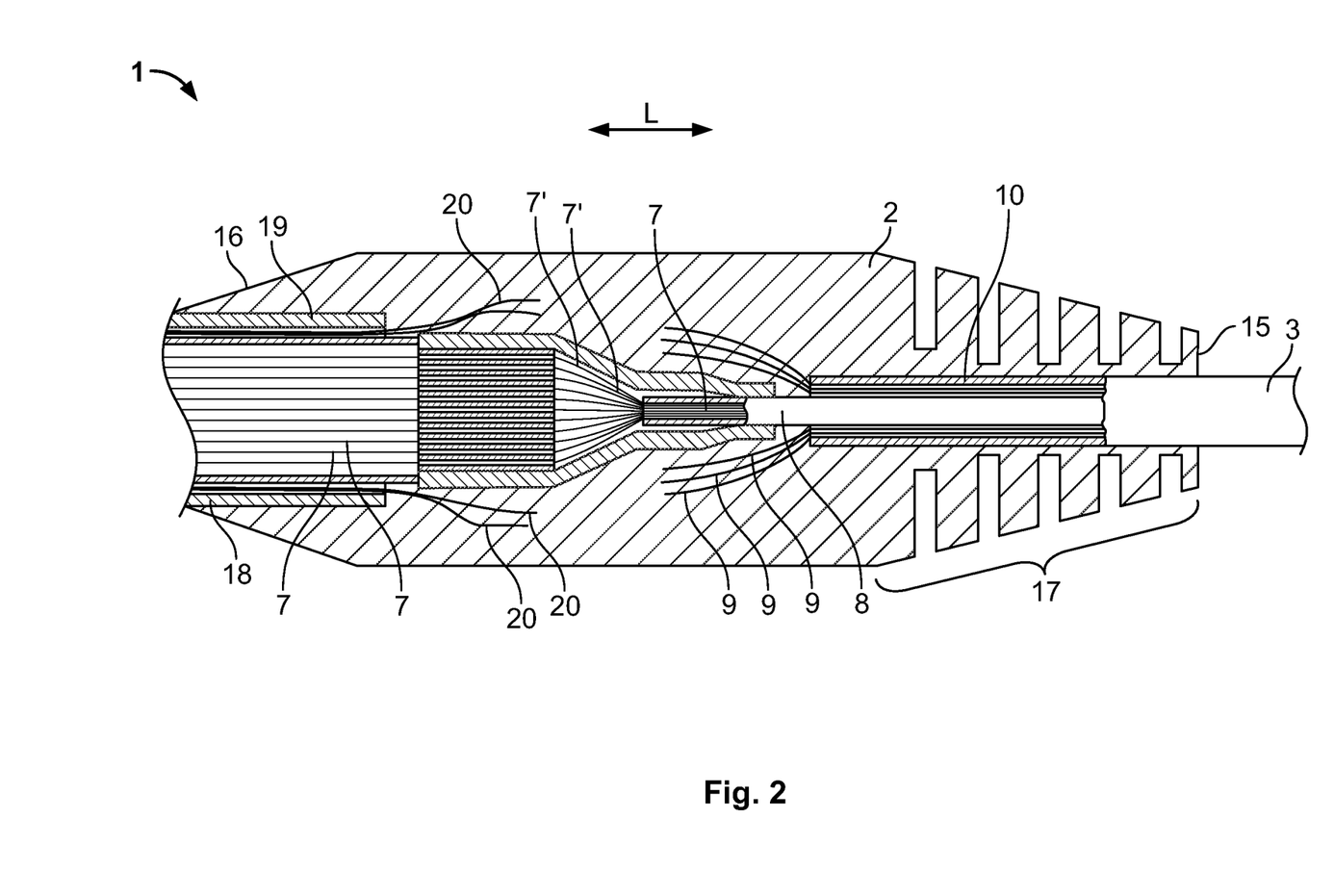
FIG. 2 is a cross sectional view of a second embodiment of said furcation assembly.

FIG. 2 shows a second embodiment of the present invention, and the same reference numerals have been used. Since most of the details illustrated therein are basically identical to the first embodiment, the differences thereto will be described in more detail.

The furcation assembly 1 is usable with any cable profile, also with substantially rectangular profiled cables, such as ribbon cable 18 shown in FIG. 2. Ribbon cable 18 has an outer protective jacket 19 surrounding reinforcement members 20, which protect the ribbonised optical fibers 7. As well as in the furcation assembly 1 shown in FIG. 1 the reinforcement members 20 are distributed and incorporated within the over-molded body 2.

Figure 3:
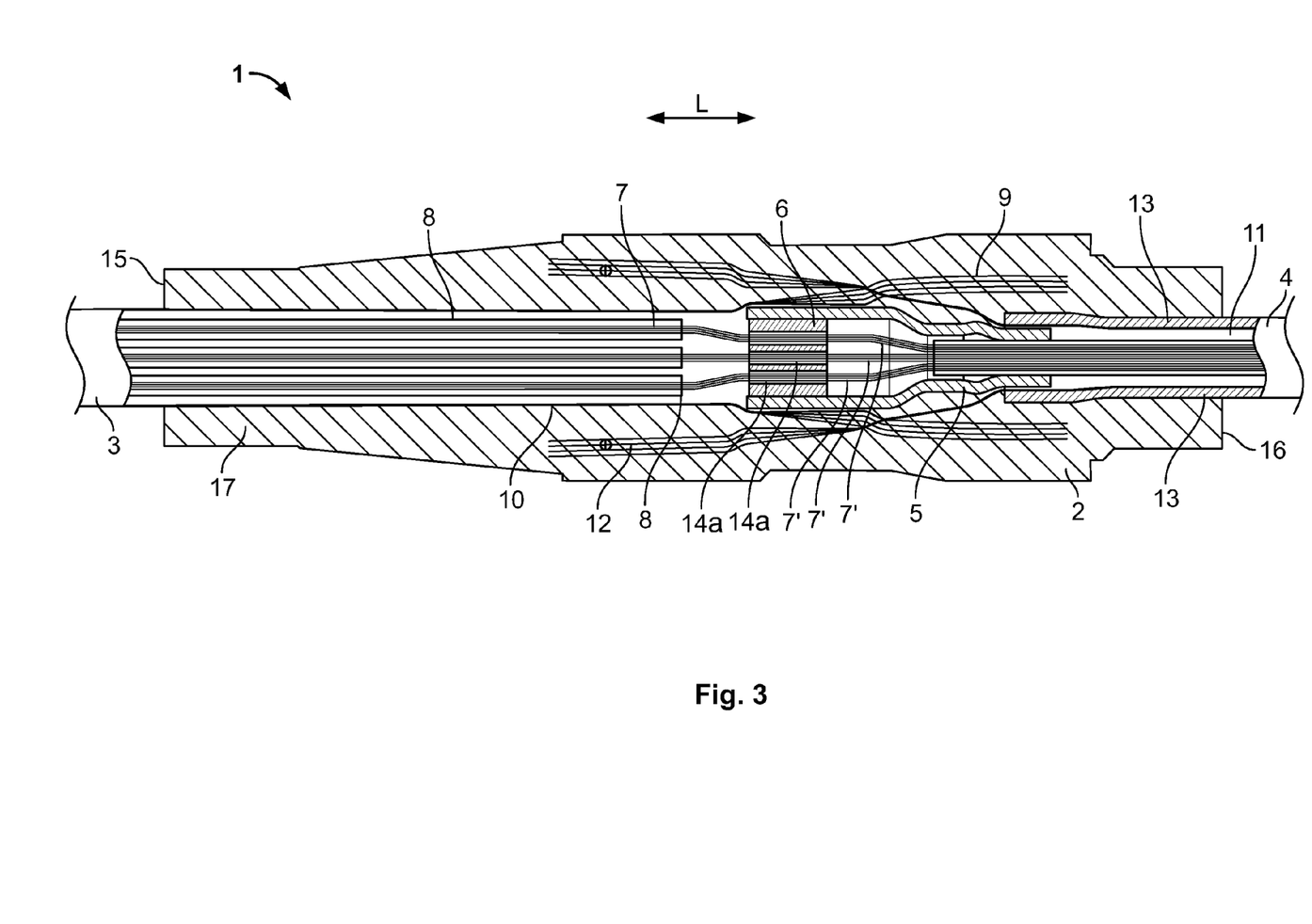
FIG. 3 is a cross sectional view of a third embodiment of said furcation assembly.

FIG. 3 shows a third embodiment of the present invention, and the same reference numerals have been used. Since most of the details illustrated therein are basically identical to the first embodiment, the differences thereto will be described in more detail.

The fiber optic distribution cable 3 contains twelve optical fibers 7, each optical fiber 7 surrounded by a buffer tube 8. The optical fibers 7 extend through the guiding element 6 to the furcation cable 4. Within the furcation cable 4 the optical fibers 7 are surrounded by a common buffer tube 11. The buffer tube 11 extends out of the cable jacket 13 into the protection tube 5 and abuts the inner surface of the opening of the protection tube 5 pointing to the furcation cable 4. The outer surface of the end of the protection tube 5 pointing to the furcation cable 4 abuts the inner surface of cable jacket 13. Between cable jacket 13 and said end of protection tube 5 the reinforcement fibers 12 extend out of the furcation cable 4 into the over-molded body 2. The reinforcement fibers 12 are embedded in the over-molded body 2 and thereby connected to the over-molded body 2 in a load transmitting connection. To receive the end of the protection tube 5 pointing to the second end 16 of the over-molded body 2 the end of the furcation cable pointing to the first end 15 of the over-molded body 2 is widened.

As well as the cable jacket 13 also the cable jacket 10 of the fiber optic distribution cable 3 is widened at its end pointing to the second end 16 of the over-molded body 2 to receive the end of the protection tube 5 pointing to the first end 15 of the over-molded body 2. The reinforcement fibers 9 which build up the cable jacket 10 enclose the end of protection tube 5 pointing to first end 15 of the over-molded body 2 and extend from the outer surface of the protection tube 5 into the over-molded body 2. As well as the reinforcement fibers 12 the reinforcement fibers 9 are embedded in the over-molded body 2 and thereby anchored within the over-molded body 2.

Figure 4:
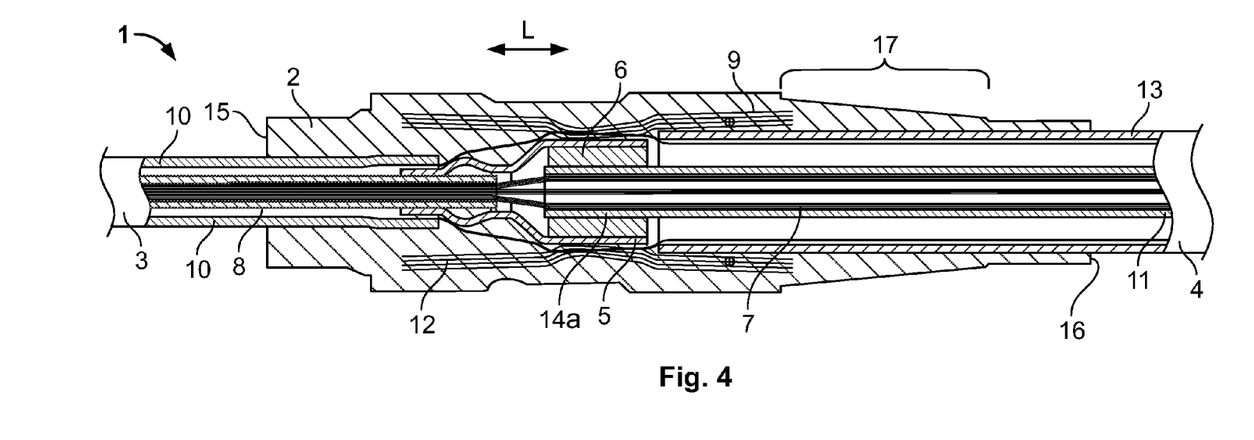
FIG. 4 is a cross sectional view of a fourth embodiment of said furcation assembly.

FIG. 4 shows a fourth embodiment of the present invention, and the same reference numerals have been used. Since most of the details illustrated therein are basically identical to the third embodiment, the differences thereto will be described in more detail.

At its first end 15 the over-molded body 2 receives a fiber optic distribution cable 3. The fiber optic distribution cable 3 comprises a cable jacket 10, encasing reinforcement fibers 9, one buffer tube 8 and within the buffer tube 8 twenty-four optical fibers 7. At its second end 16 the over-molded body 2 receives two flat ribbon cables 4, of which only the front one is shown. The buffer tubes 11 of the furcation cables 4 extend out of the cable jacket 13 into the openings 14a of guiding element 6. Within the guiding element 6 the two buffer tubes 8 are arranged in a row.

Figure 5:
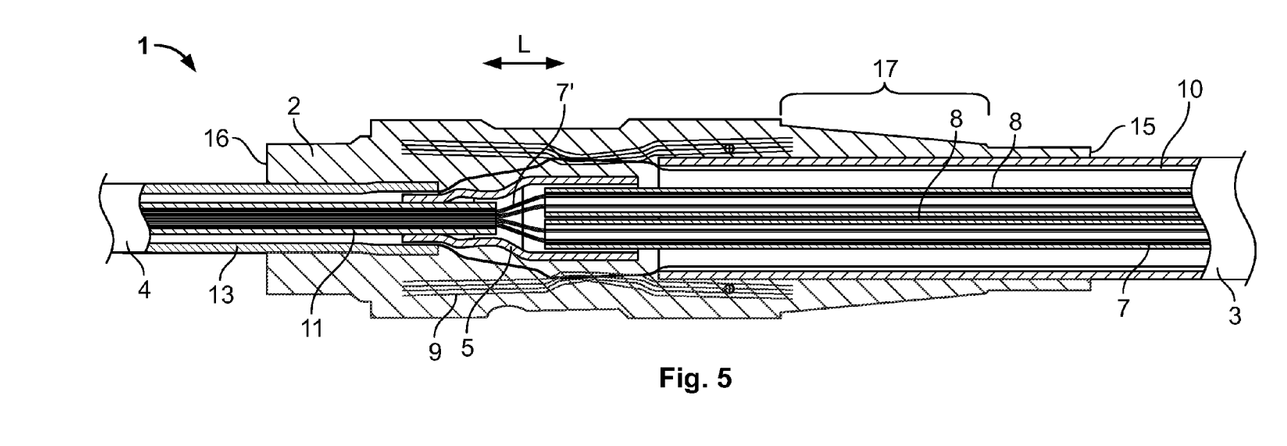
FIG. 5 is a cross sectional view of a fifth embodiment of the furcation assembly.

FIG. 5 shows a fifth embodiment of the present invention, and the same reference numerals have been used. Since most of the details illustrated therein are basically identical to the above described embodiments, the differences thereto will be described in more detail.

At the first end 15 of the over-molded body 2 a fiber optic distribution cable having two buffer tubes 8 extends into the over-molded body 2. At the second end 16 the over-molded body 2 receives a furcation cable 4 comprising one buffer tube 11. Within the protection tube 5 the optical fibers 7 coming from two separate buffer tubes 8 within the fiber optic distribution cable 3 extend into the single buffer tube 11 within furcation cable 4.

The furcation assembly 1 comprises no guiding element. The buffer tubes 8 extending from the fiber optic distribution cable 3 into the protection tube 5 abut directly to the inner surface of the opening of protection tube 5 pointing to the first end 15 of the over-molded body 2. While the end of cable jacket 13 of the furcation cable 4 is widened to receive the end of the protection tube pointing to the second end 16 of the over-molded body 2, the buffer tube 11 of the furcation cable 4 abuts to the inner surface of the opening of the protection tube 5 pointing to the second end 16 of the over-molded body 2.

Figure 6:
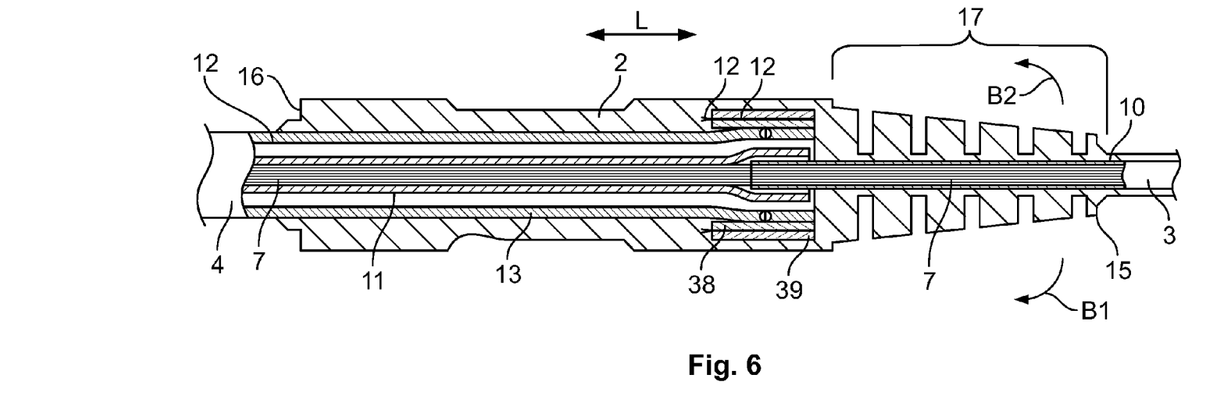
FIG. 6 is a cross sectional view of a sixth embodiment of the furcation assembly.

FIG. 6 shows a sixth embodiment of the present invention, and the same reference numerals have been used. Since most of the details illustrated therein are basically identical to the above described embodiments, the differences thereto will be described in more detail.

At the first end 15 of the over-molded body 2 a fiber optic distribution cable 3 is arranged which is formed as a flat ribbon cable comprising twelve optical fibers 7. The optical fibers extend into furcation cable 4 which is formed as a round loose tube cable 4. The reinforcement fibers 12 extend out of the cable jacket 13 to the second end 16 of the over-molded body 2. The end of the furcation cable 4 is surrounded by two rings 38 and 39, the ring 38 arranged within the ring 39. The outer ring 39 is deformed, crimping the interjacent reinforcement fibers 12 onto the inner ring 38. By this crimping connection the inner and the outer ring 38, 39 are connected mechanically to the reinforcement members and may transmit loads from the over-molded body 2 to the cable jacket 13. Thus, the rings 38, 39 serve as anchorage elements 38, 39 which are embedded in the over-molded body and thereby transmit loads from the furcation cable via the reinforcement members 9 to the over-molded body 2.

Additionally or alternatively, the cable jackets can comprise a central reinforcement member, arranged centrally within the cable between the optical fibers. Also this central reinforcement member can be anchored within the over-molded body and/or be connected to the anchorage elements in a load transmitting connection.

The strain relief portion 17 is situated at the first end of the over-molded body 2. The strain relief portion 17 comprises recesses 34 or slots 34 extending perpendicular to the longitudinal direction L. By the direction and the arrangement of the slots 34 a preferential bending plane is predetermined, which extends substantially perpendicular to the flat side of the ribbon cable 3 and results in preferential bending directions B1 and B2. The shape of the strain relief portion 17 expands from the first end 15 of the over-molded body 2 in longitudinal direction I to the end of the strain relief portion 17.

By the geometry of the recesses 34, for example the broadness or the length, the bending radius of the strain relief portion 17 can be predetermined. This allows for a minimal bending radius to avoid physical damages of the optical fibers like micro-bending.

Figure 7:
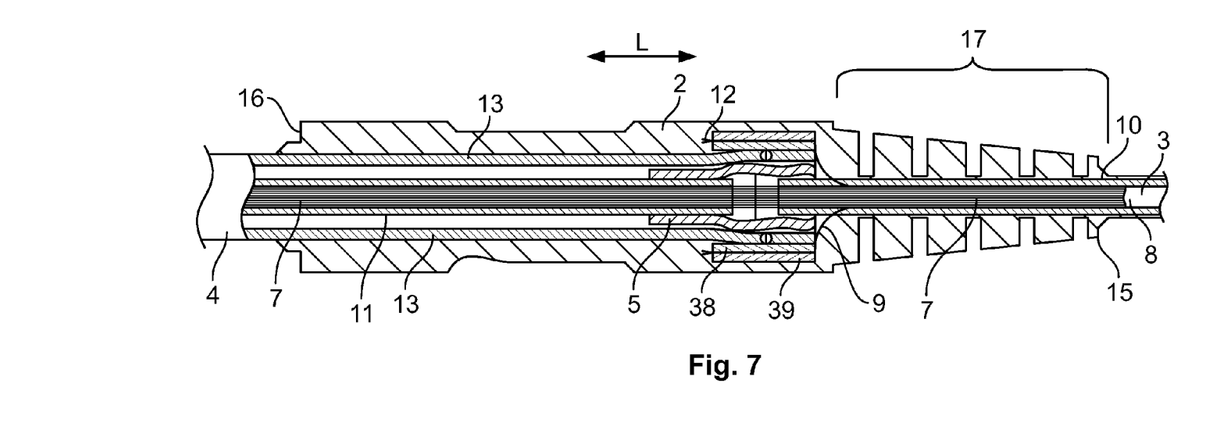
FIG. 7 is a cross sectional view of a seventh embodiment of said furcation assembly.

FIG. 7 shows a seventh embodiment of the present invention, and the same reference numerals have been used. Since most of the details illustrated therein are basically identical to the sixth embodiment, the differences thereto will be described in more detail.

At both ends of the over-molded body 2 round fiber optic cables 3, 4 are arranged. The reinforcement fibers 12 of the furcation cable 4 as well as the reinforcement fibers 9 of the fiber optic distribution cable 3 are arranged between the inner crimp member 38 and the outer crimp member 39. Both the inner crimp member 38 and the outer crimp member 39 are formed as rings, the outer crimp member 39 is deformed and presses onto the inner crimp member 38 to fix the interjacent reinforcement fibers 12.

The cable jacket 10 of the fiber optic distribution cable 3 extends into the cable jacket 13 of the furcation cable 4. As the cable jacket 10 of the fiber optic distribution cable 3 is much smaller than the cable jacket 13 of the furcation cable 4 a void remains between the cable jacket 10 and cable jacket 13. To close this void and to avoid over-molding of the optical fibers 7 a protection tube 5 is inserted into the cable jacket 13 which abuts the outer surface of the cable jacket 10 and the inner surface of cable jacket 13, sealing the opening at the end of furcation cable 4.

Figure 8:
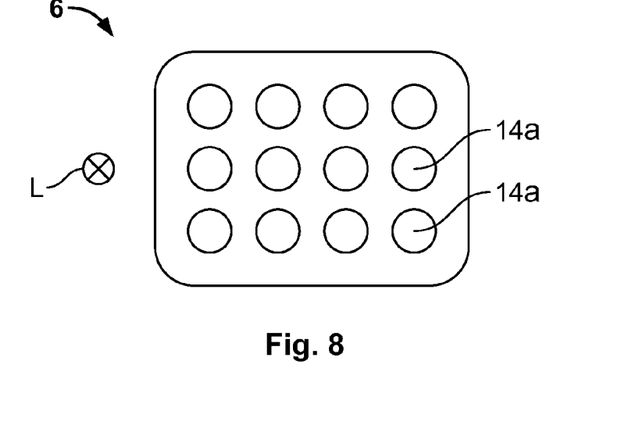
FIG. 8 is a lateral view of an exemplary embodiment of the guiding element.

FIG. 8 shows a lateral view of a first embodiment of guiding element 6. The guiding element 6 has a substantially rectangular shape and comprises twelve openings for guiding twelve optical fibers. In further embodiments of the guiding element 6 the shape may be adapted to different shapes of fiber optic cables received by the furcation assembly. The guiding element 6 can, for example, be provided with a round shape, fitting to a concentric arrangement of optical fibers within a round shaped fiber optic cable.

The guiding element 6 comprises 12 openings 14a for guiding 12 optical fibers. The openings of the guiding element 6 may extend in longitudinal direction L, pointing from the first end 15 to the second end 16 of the over-molded body 2. This axial aligning of the openings 14a to the fiber direction of the distribution cable 3 and/or the furcation cables 4 allows for a low profile, minimum diameter furcation assembly 1.

The direction of the openings 14a within the guiding element 6 can be adapted to the geometrical configuration of the fiber optic cables connected by the furcation assembly. In further preferential embodiments of the guiding element 6 the openings 14a can diverge in or against a direction from the first to the second end of the over-molded body. Such diverging openings facilitate a sliding transition of optical fibers through the furcation assembly, particularly if the distance between the single fibers at the first end of the over-molded body differs from the distance of the single fibers at the second end of the over-molded body.

To protect the furcated optical fibers 7' and the adjacent fiber optic cables 4 against transversal forces exerted onto the furcation assembly, the guiding element 6 is made of substantially rigid material. The rigid material inhibits a contraction of the openings 14a while the guiding element 6 is compressed by external forces.

Figure 9:
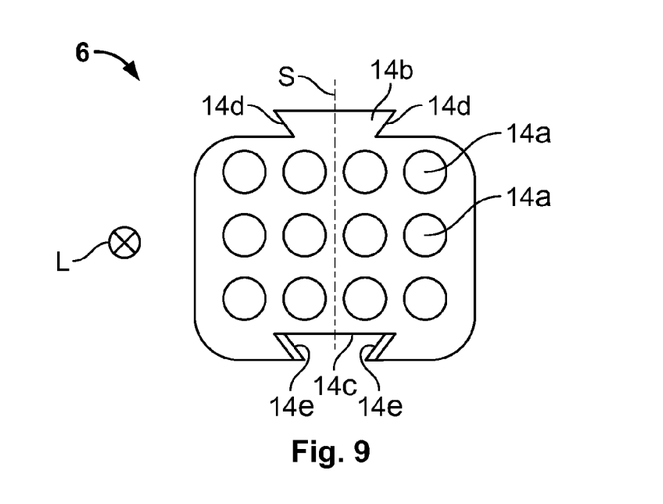
FIG. 9 is a lateral view of a second embodiment of the guiding element.

FIG. 9 shows a second embodiment of the guiding element 6, and the same reference numerals have been used. Since most of the details illustrated therein are basically identical to the first embodiment of the guiding element 6, the differences thereto will be described in more detail.

The guiding element 6 comprises an undercut protrusion 14b and an undercut groove 14c. The profile of undercut protrusion 14b is shaped like a swallowtail and built up symmetrically to symmetry line S. The profile tapers in direction of the center of guiding element 6 and in longitudinal direction L. The profile of the undercut groove 14c corresponds to the profile of the undercut protrusion 14b so that an undercut groove 14c of a first guiding element 6 is adapted to receive an undercut protrusion 14b of a second guiding element 6. Due to the tapering of the shape of the protrusion 14b and the groove 14c by converging side faces 14d, 14e a protrusion 14b can be inserted into groove 14c, but is stopped by contact of side faces 14d, 14e. Thus, the protrusion 14b engaging with groove 14c builds a form closure which can be locked by a force transmission by friction between side faces 14d, 14e.

Figure 10:
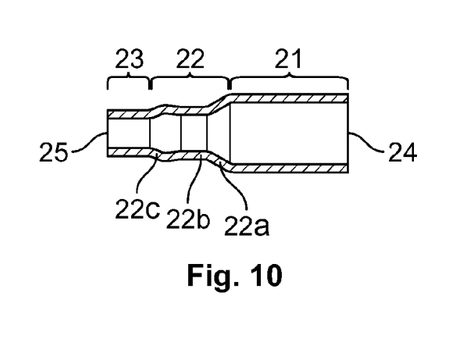
FIG. 10 is a cross sectional side view of a first exemplary embodiment of the protection tube.
Figure 11:
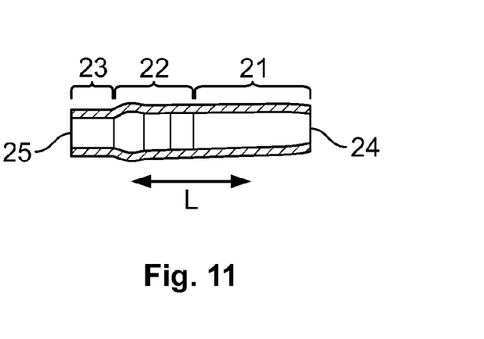
FIG. 11 is a further cross sectional side view of the first embodiment of the protection tube.

FIGS. 10 to 15 show three exemplary embodiments of protection tube 5. FIGS. 10 and 11 are side views of a first exemplary embodiment of the protection tube 5 for receiving a round tube fiber optic cable comprising 24 optical fibers and two flat fiber optic cables, each comprising 12 optical fibers. The corresponding embodiment of the furcation assembly is shown in FIG. 4. The inner shape of the protection tube 5 is adapted to the outer shape of the components received by the protection tube. The protection tube 5 can be made of elastic material which resiliently abuts the outer surfaces of the components arranged within. At a first section 21 the buffer tubes of two flat fiber optic cables are inserted into the protection tube 5. The inner shape of the first section 21 is adapted to receive two buffer tubes arranged in a row. The buffer tubes can abut to the protection tube 5 an thereby close the opening 24 of the protection tube 5. Alternatively, a cable jacket of a distribution cable or furcation cable which outer diameter fits to the inner diameter of section 21 can be inserted into section 21.

The second section 22 of the protection tube 5 provides space for the diverging or converging optical fibers running from the distribution cable to the furcation cable and allows for flexible bending of the ends of the protection tube 5. The funnel shaped portion 22a widens the profile of protection tube 5 to provide space for diverging optical fibers. Portion 22b connects portion 22a to portion 22c. The round shape of portion 22c facilitates flexible deformation or bending of protection tube 5.

A third section 23 of the protection tube serves for receiving the end portion of the outer jacket or buffer tube of the fiber optic distribution cable. The fiber optic distribution cable is connected to the protection tube 5 by a frictional connection between the third section 23 of the protection tube 5 and a portion of the inserted buffer tube or outer jacket of the fiber optic distribution cable.

Figure 12:
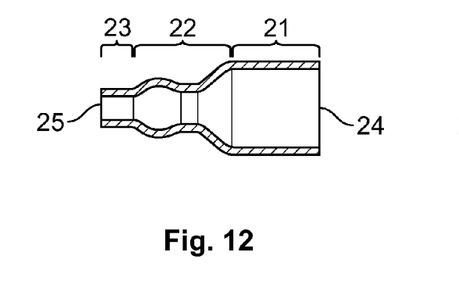
FIG. 12 is a cross sectional view of a second embodiment of the protection tube.
Figure 13:
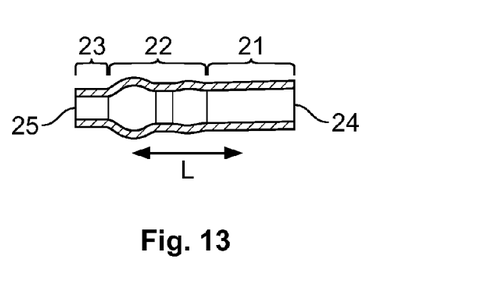
FIG. 13 is a further cross sectional side view of the second embodiment of the protection tube.

FIGS. 12 and 13 are side views of a second exemplary embodiment of the protection tube 5 for receiving a round tube fiber optic cable comprising 24 optical fibers and two round tube fiber optic cables, each comprising 12 optical fibers. The corresponding embodiment of the furcation assembly is shown in FIG. 5.

Figure 14:
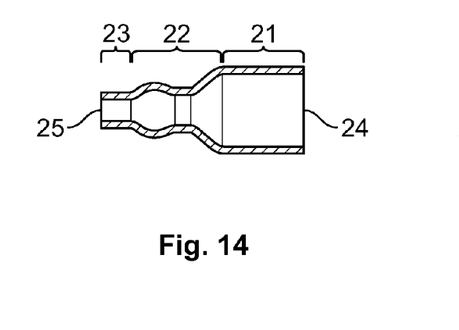
FIG. 14 is a cross sectional view of a third embodiment of the protection tube.
Figure 15:
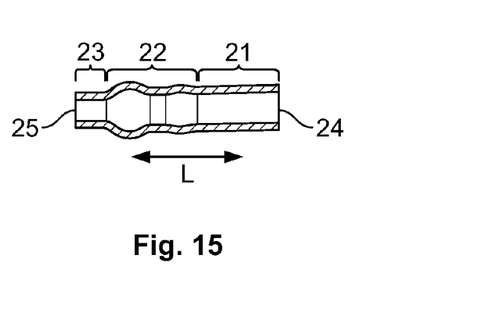
FIG. 15 is a further cross sectional side view of the third embodiment of the protection tube.

FIGS. 14 and 15 are side views of a third exemplary embodiment of the protection tube 5 for receiving a round tube fiber optic cable comprising 12 optical fibers and twelve round tube fiber optic cables, each comprising 1 optical fiber. The corresponding embodiment of the furcation assembly is shown in FIG. 3.

Figure 16:
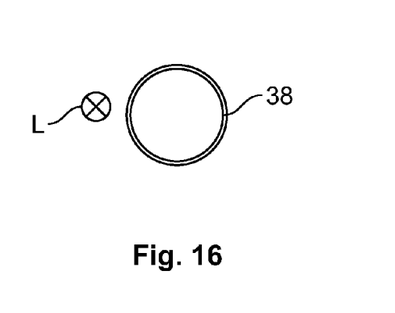
FIG. 16 is a side view of an inner crimp member 38.
Figure 17:
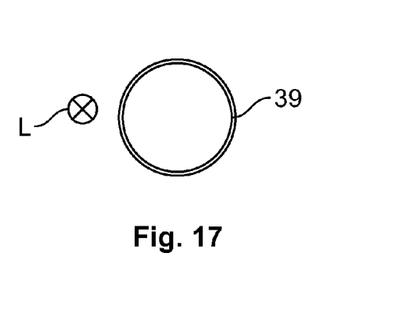
FIG. 17 is a side view of an outer crimp member 39.

FIGS. 16 and 17 are side views of anchoring elements 38, 39, formed as rings 38, 39 as used in the embodiments of the furcation assembly shown in FIGS. 6 and 7.

Figure 18:
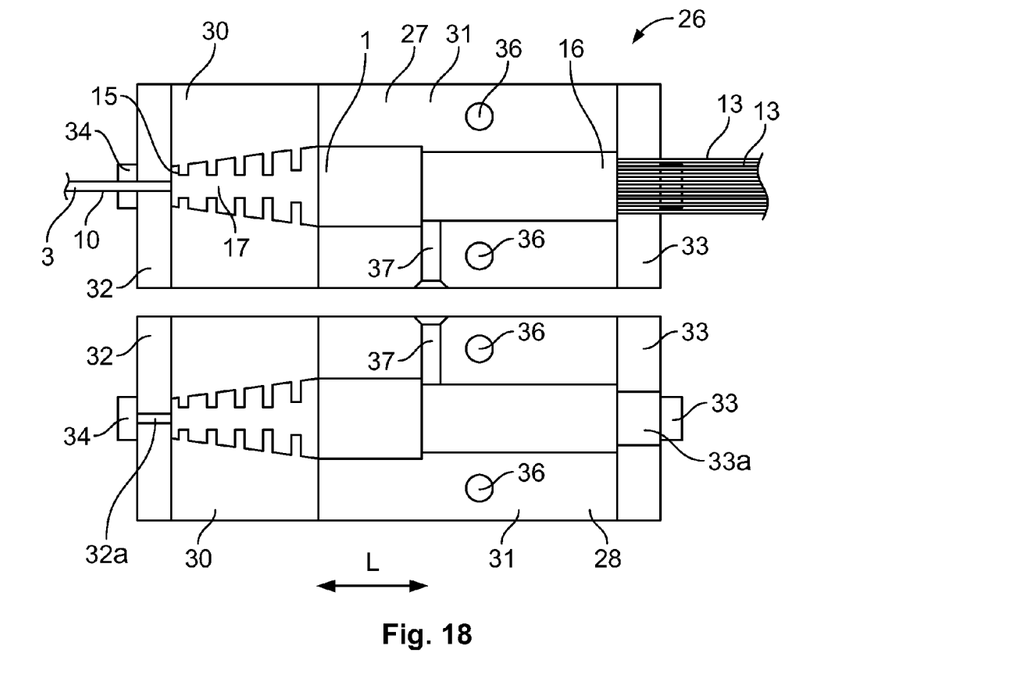
FIG. 18 is a top view of a first exemplary embodiment of molds for over molding the furcation assembly.

FIG. 18 shows a lateral view of a mold for manufacturing the over-molded body. The mold 26 is built up by a modular assembly. Each half 27, 28 of the mold 26 comprises four parts 29, 30, 31, 32, 33 which are connected to each other by screws 34. The end parts 32, 33 are adapted to receive the outer cable jackets 10, 13, connected by the over-molded body 2. The relief molding part 30 serves for molding the outer shape of the strain relief portion 17 of the over-molded body 2. The inflow part 31 comprises the inflow 37 for filling the mold. Within the inflow part 31 the main part of the over-molded body 2 is formed.

The modular assembly of the mold 26 allows for exchanging the parts of the mold for combining different geometries. By combining differently shaped mold parts the furcation assembly can be adapted to different cable jacket profiles or to different guiding elements. The cable receive parts 32, 33 comprise recesses 32a, 33a for receiving the fiber optic cables to be incorporated into the furcation assembly. The recesses 32a, 33a are adapted to the geometry of the cable jackets 10, 13 extending into the over-molded body. The relief molding part 30 determines the geometry of the strain relief portion 17. Additionally or alternatively to a strain relief portion 17, a further strain relief portion at the second end 16 of the over-molded body 2 can be arranged by adding a relief molding part to both halves 27, 28 of the mold. The shape of the inflow part 31 accounts for the geometry of the guiding element 6.

Figure 19:
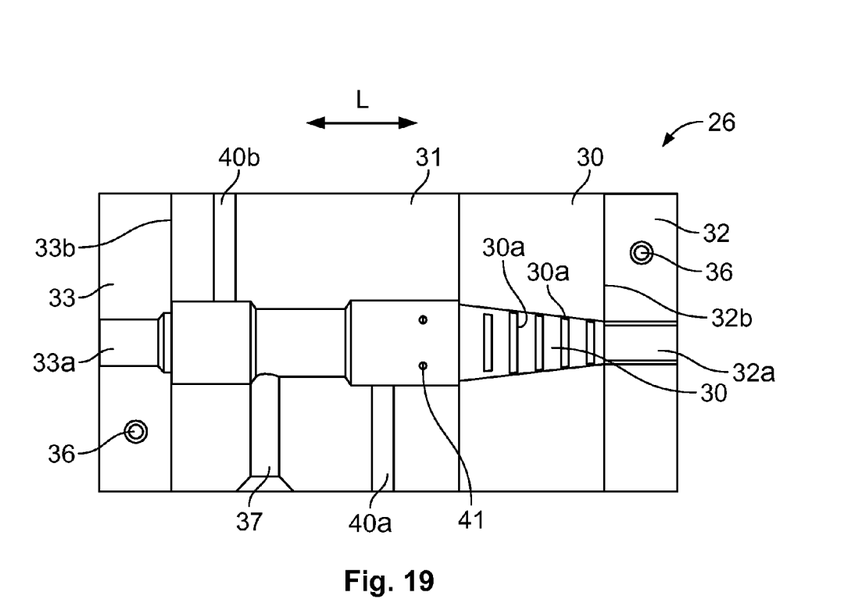
FIG. 19 is a top view of a second embodiment of a mold for over molding the furcation assembly.

FIG. 19 shows a second embodiment of the mold 26, and the same reference numerals have been used. Since most of the details illustrated therein are basically identical to the first embodiment of the mold 26, the differences thereto will be described in more detail.

The recess 33a of cable receive part 33 is adapted to receive a round cable jacket while the recess 32a of cable receive part 32 is adapted to receive two flat cable jackets. The ends 32b and 33b of the cable receive parts 32, 33 mark the ends of the over-molded. As the preferred bending direction of the flat cables extends substantially transverse to the flat side of the cable, the relief molding part 30 comprises transversal protrusions 30a for molding recesses within the strain relief portion of the over-molded body which extend parallel to the flat side of the cables and transversally to the longitudinal direction L.

The mold comprises vent channels 40a, 40b to allow gas which emerges during the molding process to exhaust. The vent channels 40a, 40b have a very flat profile, hindering the melt from passing off.

Centring nipples 41 serve for centering the above described crimp members 38, 39 within the mold 26 to assure that the crimp members 38, 39 are fully embedded in the over-molded body or completely surrounded by melt. After inserting the cables into the crimp members 38, 39 or rings 38, 39, the larger ring is positioned on the centering nipples 41. In this position the rings 38, 39 are arranged coaxial to the recesses of the mold.

Figure 20:
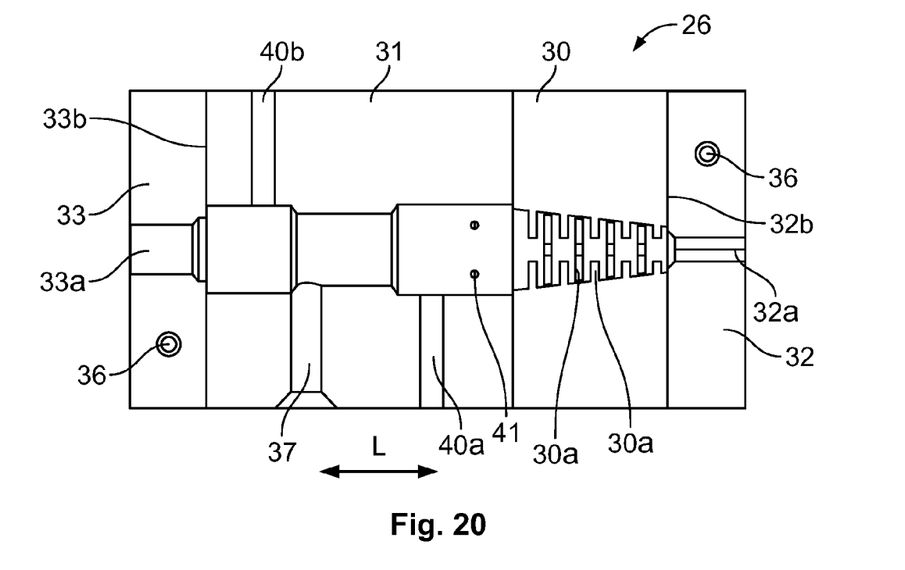
FIG. 20 is a top view of a third embodiment of a mold for over molding the furcation assembly.

FIG. 20 shows a third embodiment of the mold 26, and the same reference numerals have been used. Since most of the details illustrated therein are basically identical to the first and second embodiment of the mold 26, the differences thereto will be described in more detail.

The recess 33a of cable receive part 33 is adapted to receive a round cable jacket while the recess 32a of cable receive part 32 is adapted to receive two round cable jackets. As the round cables have no preferred bending axis, the relief molding part 30 is provided with protrusions extending alternating in directions which run transversally to the longitudinal direction L and vertically to each other.

Figure 21:
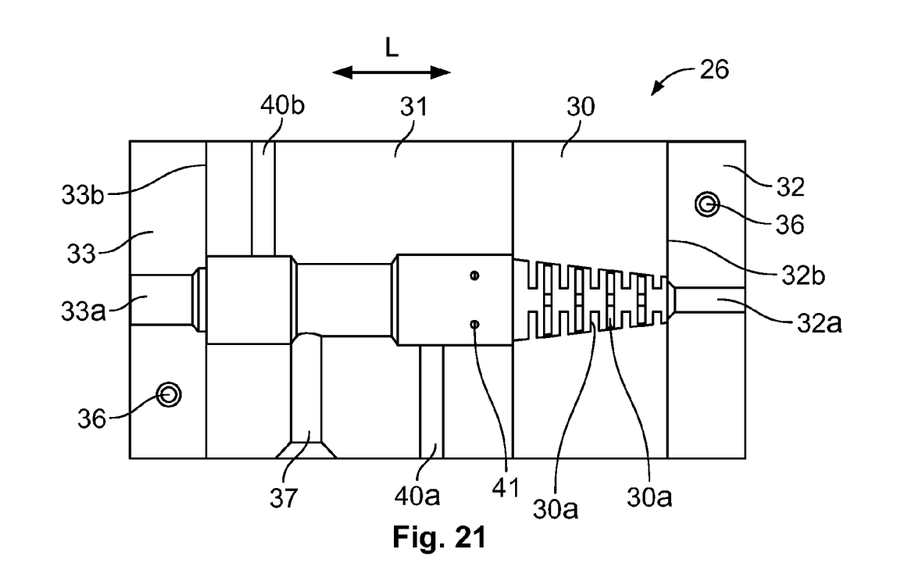
FIG. 21 is a top view of a fourth exemplary embodiment of a mold for over molding the furcation assembly.

FIG. 21 shows a fourth embodiment of the mold 26, and the same reference numerals have been used. The recesses 33a of cable receive part 33 and the recess 32a of cable receive part 32 are adapted to receive a round cable jacket for molding a furcation assembly as shown in FIG. 7.

The foregoing is a description of various embodiments of the invention that are given here by way of example. Although fiber optic furcation assemblies have been described with reference to preferred embodiments and examples thereof, other equivalent embodiments and examples may perform similar functions and/or achieve similar results.

The invention claimed is:

1. A fiber optic furcation assembly, comprising an over-molded body formed from a flexible material and a mold and having a first end and an opposed second end, the first end being adapted to receive a portion of at least one fiber optic distribution cable having at least two optical fibers, and the second end being adapted to receive a portion of at least one furcation cable jacket sheathing having at least one furcated optical fiber from the fiber optic distribution cable, at least one of the fiber optic distribution cable and the furcation cable jacket comprising reinforcement members, wherein at least a portion of the reinforcement members is anchored within the over-molded body such that the reinforcement members are separated from the fiber optic distribution cable and the furcation cable jacket before forming the over-molded body in the mold, the reinforcement members being positioned within the mold and around the fiber optic distribution cable and the furcation cable jacket such that the portion of the reinforcement members is incorporated into the over-molded body when the over-molded body is formed within the mold so as to transmit a load from the over-molded body via the anchored reinforcement members to the respective cable.

2. A fiber optic furcation assembly according to claim 1, wherein the fiber optic furcation assembly comprises at least one guiding element for guiding the furcated optical fibers, the guiding element being arranged between the first end and the second end of the over-molded body.

3. A fiber optic furcation assembly according to claims 2, wherein the guiding element has at least two openings and in that the furcated optical fibers are arranged movable within the openings.

4. A fiber optic furcation assembly according to claim 3, wherein within an opening of the guiding element only a single optical fiber is arranged.

5. A fiber optic furcation assembly according to claim 2, wherein the openings extend into a longitudinal direction, pointing from the first end to the second end of the over-molded body.

6. A fiber optic furcation assembly according to claim 2, wherein the furcated optical fibers are received in the openings so as to be movable at least in the longitudinal direction.

7. A fiber optic furcation assembly according to claim 2, wherein the guiding element is made of substantially rigid material.

8. A fiber optic furcation assembly according to claim 2, wherein the furcation assembly comprises at least two guiding elements, the guiding elements having at least one undercut protrusion and/or at least one undercut groove, the shape of the groove of a first guiding element adapted to receive the protrusion of a second guiding element.

9. A fiber optic furcation assembly according to claim 1, wherein the furcation assembly comprises a protection tube, said protection tube encasing at least a section of the fibers between the first end and the second end of the over-molded body.

10. A fiber optic furcation assembly according to claim 9, wherein the protection tube is made of resilient material.

11. A fiber optic furcation assembly according to claim 9, wherein the protection tube has an end facing the first end of the over-molded body, which is closed by a portion of the fiber optic distribution cable.

12. A fiber optic furcation assembly according to claim 9, wherein the protection tube has an end facing the second end of the over-molded body, which is closed by the guiding element.

13. A fiber optic furcation assembly according to claim 1, wherein the over-molded body comprises at least one strain relief portion, said strain relief portion situated at the first end and/or second end of the over-molded body, being adapted to deform resiliently in a direction substantially perpendicular to the longitudinal direction.

14. A fiber optic furcation assembly according to claim 1, wherein at least one anchorage element is provided for anchoring the reinforcement members, said anchorage element being connected to the reinforcement members in a load-transmitting connection and being embedded in the over-molded body.

15. A fiber optic furcation assembly according to claim 1, wherein at least a portion of the reinforcement members is anchored within the over-molded body by being embedded therein.

16. A method of making a fiber optic furcation assembly, comprising the steps of:
   providing a mold having a first end and an opposing second end;
   providing at least one fiber optic distribution cable having at least two optical fibers;
   furcating at least one optical fiber from the fiber optic distribution cable;
   providing a furcation cable jacket sheathing on the at least one furcated optical fiber;
   providing reinforcement members on at least one of the one fiber optic distribution cable or furcation cable jacket sheathing;
   positioning the at least one fiber optic distribution cable in the first end of the mold;
   positioning the furcation cable jacket sheathing in the second end of the mold;
   separating the reinforcement members from the fiber optic distribution cable or the furcation cable jacket;
   positioning the reinforcement members within the mold and around the fiber optic distribution cable and the furcation cable jacket;
   over-molding a body formed from a flexible material around the fiber optic distribution cable and furcation cable jacket; and
   anchoring at least a portion of the separated reinforcement members within the over-molded body such that a portion of the reinforcement members is incorporated into the over-molded body when the over-molded body is formed within the mold so as to transmit a load from the over-molded body via the anchored reinforcement members to the respective cable.

* * * * *